US012394129B2

(12) United States Patent
Shvedai et al.

(10) Patent No.: US 12,394,129 B2
(45) Date of Patent: Aug. 19, 2025

(54) SYSTEMS AND METHODS FOR ANIMATING TRANSITION OF AN OBJECT

(71) Applicants: Atlassian Pty Ltd., Sydney (AU); Atlassian Inc., San Francisco, CA (US)

(72) Inventors: Eduard Shvedai, Port Macquarie (AU); Alexander James Reardon, Sydney (AU); James Rotanson, Sydney (AU); Jerome Touffe-Blin, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/853,855

(22) Filed: Jun. 29, 2022

(65) Prior Publication Data

US 2024/0005586 A1 Jan. 4, 2024

(51) Int. Cl.
*G06T 13/80* (2011.01)
*G06F 3/0482* (2013.01)

(52) U.S. Cl.
CPC ............ *G06T 13/80* (2013.01); *G06F 3/0482* (2013.01)

(58) Field of Classification Search
CPC .............................. G06T 13/80; G06F 3/0482
See application file for complete search history.

(56) References Cited

U.S. PATENT DOCUMENTS

| | | | |
|---|---|---|---|
| 2009/0150813 A1* | 6/2009 | Chang | G06F 3/0481 715/764 |
| 2018/0061110 A1* | 3/2018 | Flores | G06T 13/80 |
| 2018/0335912 A1* | 11/2018 | Nilo | G06F 3/0412 |
| 2022/0139056 A1* | 5/2022 | Fieldman | G06T 13/20 345/419 |
| 2022/0214856 A1* | 7/2022 | Smith | G06T 19/20 |
| 2023/0154058 A1* | 5/2023 | Louie | H04L 67/131 345/633 |

\* cited by examiner

*Primary Examiner* — Michelle Chin
(74) *Attorney, Agent, or Firm* — Brownstein Hyatt Farber Schreck, LLP

(57) ABSTRACT

Systems, methods, and non-transitory computer-readable medium for animating transition of an object in a shared user interface displayed on a client device in response to a remote user performing a transition is disclosed. The method includes retrieving an animation object associated with a transition event, at a client device. The animation object includes an identifier of the object transitioned by the remote user, an origin location of the transitioned object and a destination location of the transitioned object in a user interface. The method further includes determining whether animation is required for the animation object. Upon determining that animation is required, the method further includes animating a transition of the transitioned object to the destination location based on the animation object and updating the position of the transitioned object in a local state cache of the user interface.

20 Claims, 8 Drawing Sheets

SYSTEMS AND METHODS FOR ANIMATING TRANSITION OF AN OBJECT

TECHNICAL FIELD

Aspects of the present disclosure are directed to graphical user interfaces, and in particular, to system and method for animating transitions in shared graphical user interfaces.

BACKGROUND

Background information described in this specification is background information known to the inventors. Reference to this information as background information is not an acknowledgment or suggestion that this background information is prior art or is common general knowledge to a person of ordinary skill in the art.

With teams being more and more distributed, collaborative software applications that help people working on a common task to attain their goals are becoming essential. There are generally two types of collaborative software. One type is known as version control, which allows separate users to make parallel edits to files, while preserving every saved edit by every user as multiple files (that are variants of the original file). The other type is known as real-time collaborative editing software that allows multiple users to engage in live, simultaneous, and reversible editing of a single file.

Typically, in real-time collaborative editing, a user makes a change to a document and this change is communicated to each of the other users that are currently viewing and/or editing the document. Often, the changes are highlighted briefly so that other users can easily see what has been changed, added, or deleted.

There is still, however, a need for improving the user interfaces of such collaborative editing applications so that the manner in which the changes are depicted to other users has a natural feel.

SUMMARY

Example embodiments described herein are directed to a computer-implemented method for animating transition of an object in a shared user interface displayed on a client device in response to a remote user performing a transition is disclosed. The method includes retrieving an animation object associated with a transition event, at a client device. The animation object includes an identifier of the object transitioned by the remote user, an origin location of the transitioned object and a destination location of the transitioned object in a user interface. The method further includes determining whether animation is required for the animation object. Upon determining that animation is required, the method further includes animating a transition of the transitioned object to the destination location based on the animation object and updating the position of the transitioned object in a local state cache of the user interface.

Some example embodiments are directed to a computer processing system including a processing unit, a communication interface, and a non-transitory computer-readable storage medium storing instructions. When these instructions are executed by the processing unit, they cause the processing unit to perform the computer-implemented method described above.

Still other example embodiments are directed to a non-transitory storage medium storing instructions executable by processing unit to cause the processing unit to perform the computer-implemented method described above.

Figure 1A:
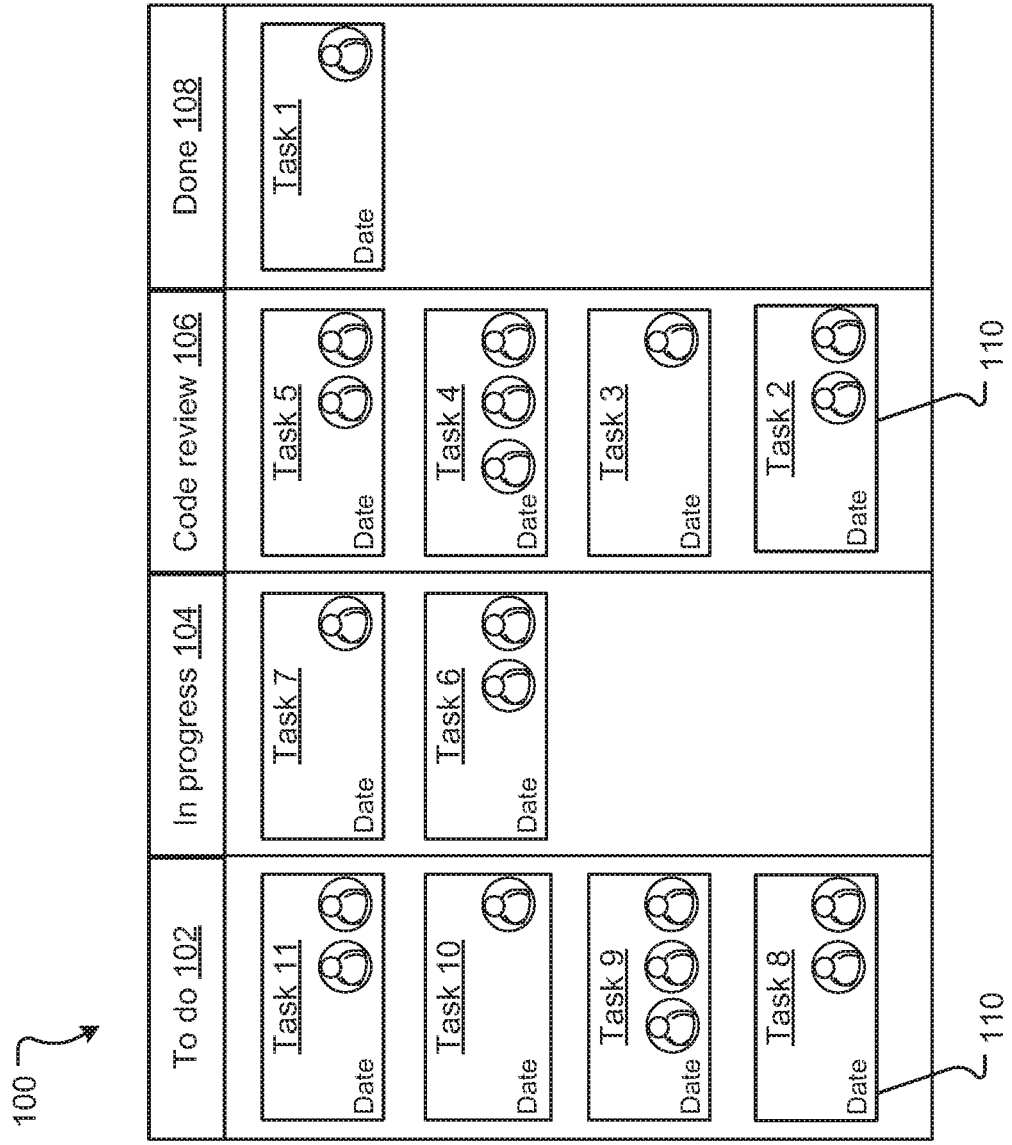
FIG. 1A is a diagram of an example virtual board.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

Very generally speaking, various computing applications and systems (such as object tracking systems) provide mechanisms for creating and rendering objects, object states, and transitioning objects between states within a virtual board environment.

As used herein, an object tracking system (or object tracking application) is any system (or application) that at least facilitates the tracking of objects between states and the visualization of objects in object states by generation, rendering and display of virtual boards.

One example of an object tracking application (as referred to in the present context) is Trello. Trello allows users to create objects in the forms of cards or objects and object states in the form of lists or columns. In order to change an object state in Trello an object is transitioned from one list to another. For example, a Trello user may set up a virtual board (a list of lists) having one or more lists such as "To Do," "In Progress," and "Completed." A user may then create cards in respect of particular tasks that need to be done and add them to the "To Do" list: for example, a "grocery shopping" card, a "washing up" card, an "organize house party" card, etc.

A further example of what the present disclosure refers to as an object tracking application is Jira. Jira allows users to create objects in various forms, for example issues or, more generally, work items. A work item in Jira is an object with associated information and an associated workflow, that is, a series of states through which the work item transitions over its lifecycle. Any desired workflow may be defined for a given type of work item. Further examples of what the present disclosure refers to as an object tracking application are Bugzilla, and Asana, to name but a few.

Object tracking applications such as those described above often provide user interfaces for displaying the current state of objects maintained by the application and allowing users to move objects (e.g., tasks in Trello, work items in Jira) between states (or lists). In both Trello and Jira such user interfaces are referred to as virtual boards. A board (also interchangeably referred to as a virtual board herein) is generally a tool for workflow visualization. Generally speaking, a board includes cards, columns, and/or swimlanes to visualize workflows in an effective manner. Each card in the board may be a visual representation of an object (e.g., task in Trello, work item in Jira) and may include information about the object, such as deadlines, assignee, description, etc. Each column in the board represents a different state (e.g., stage of a workflow in Jira or a list in Trello). The cards typically progress through the columns until their completion. Swimlanes are horizontal lanes that can be used to separate different activities, teams, classes or services, etc.

FIG. 1A provides an example virtual board 100, which shows a workflow to track software development projects. In particular, the board 100 includes four lists or columns, each corresponding to a workflow state: TO DO 102; IN PROGRESS 104; CODE REVIEW 106; and DONE 108. Board 100 also includes several cards 110, i.e., visual representations of objects (work items in the present context), each of which is in a particular column according to the current state of the object. Each card may include information about the underlying object —.e.g., it may include an object title and description, a date by which the object is to be completed or was completed, and information about one or more users assigned to complete the object. It may include other content as well including, but not limited to: text; icons; pictures; and video. The card contents often defines the size of the card 110 that is rendered—the more card content the larger the card size. Further, it will be appreciated that card width may be fixed or may change based on the number of columns in the board 100 and/or the screen size. The card height on the other hand may change based on the content of the card.

Typically, the cards/objects 110 displayed in a virtual board are interactive and/or 'draggable'. That is, these cards can be moved from one location to another in the virtual board based on user input control, e.g., via a keyboard, mouse, or touchscreen. Further, the columns in the virtual boards are themselves 'draggable' and also 'droppable'. That is, a user can re-arrange the lists/columns in any desired order by dragging and dropping the lists on the user interface and the area of the user interface occupied by a given column is a droppable area in which draggable cards/object 110 can be dropped. Accordingly, users can move cards around within a particular column, for example by selecting and dragging or other means, to change the order of cards in the column. When a card is moved within a list, the state of the object does not change. For example, a card that is positioned at the top of a list can be moved to a chosen position lower down that same list such that the object state does not change, only the position of the object within the state is changed.

Further, users can transition cards between columns/lists, for example by selecting and dragging or other means, from its current column to another one. For example, once the user has completed task 11 (in the virtual board 100 shown in FIG. 1), the user can select and drag the corresponding card from the "To Do" list and drop it into the "Completed" list. If the user has started but not completed work on this task they can instead select and drag the corresponding card from the "To Do" list to be dropped into the "In Progress" list.

Figure 1B:
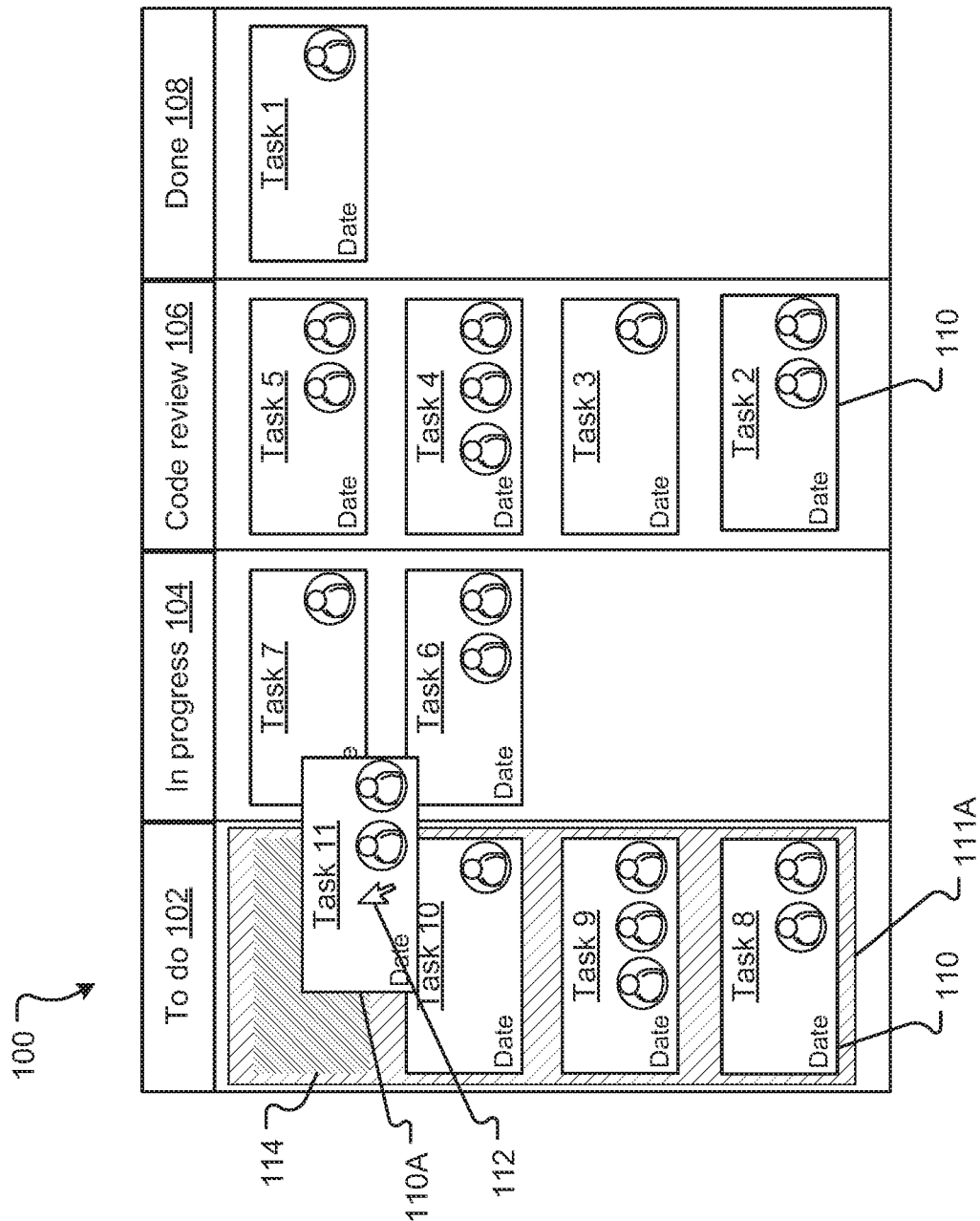
FIGS. 1B-1D are diagrams showing an example virtual board during a card transition at three different points in time.
Figure 1C:
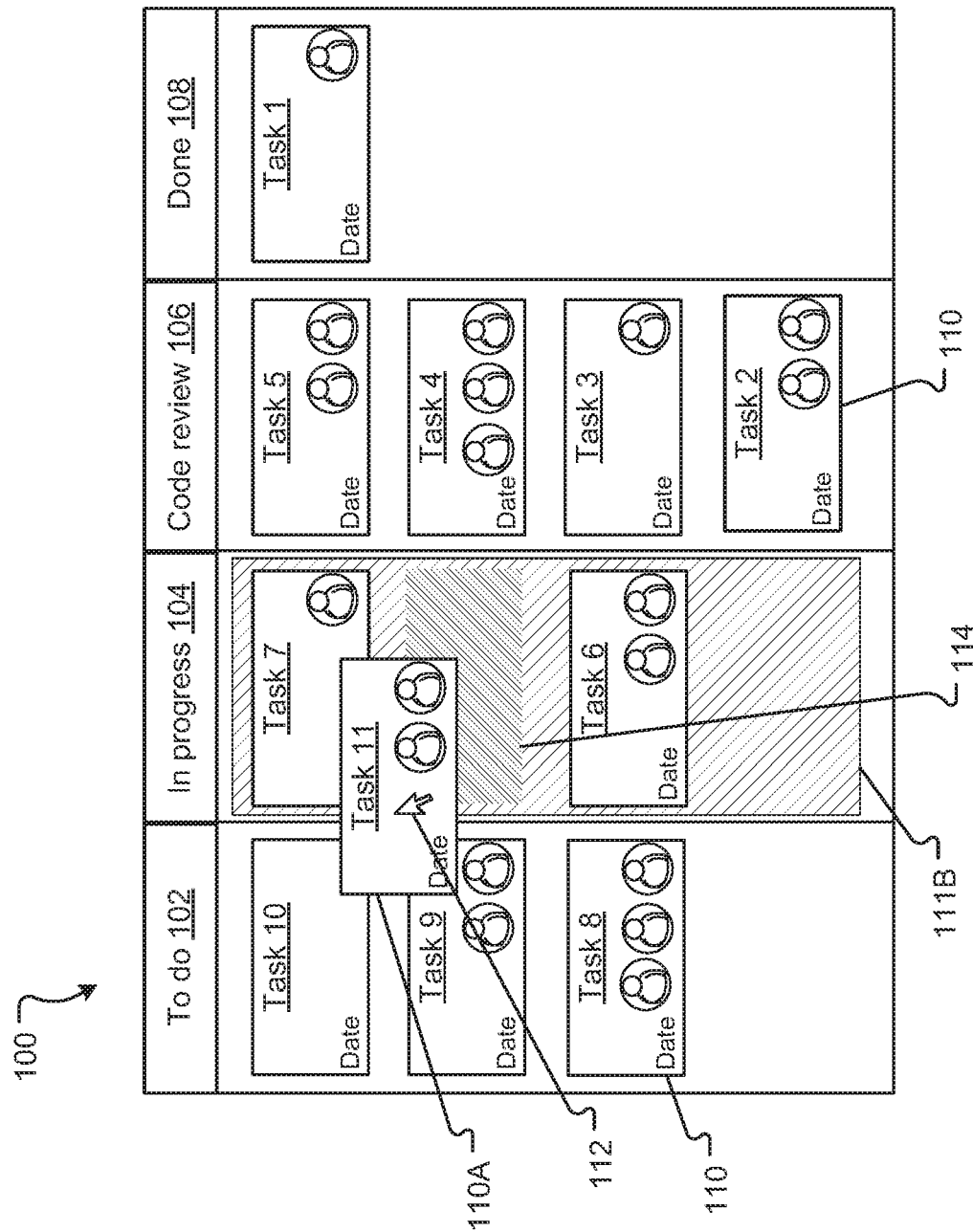
Figure 1D:
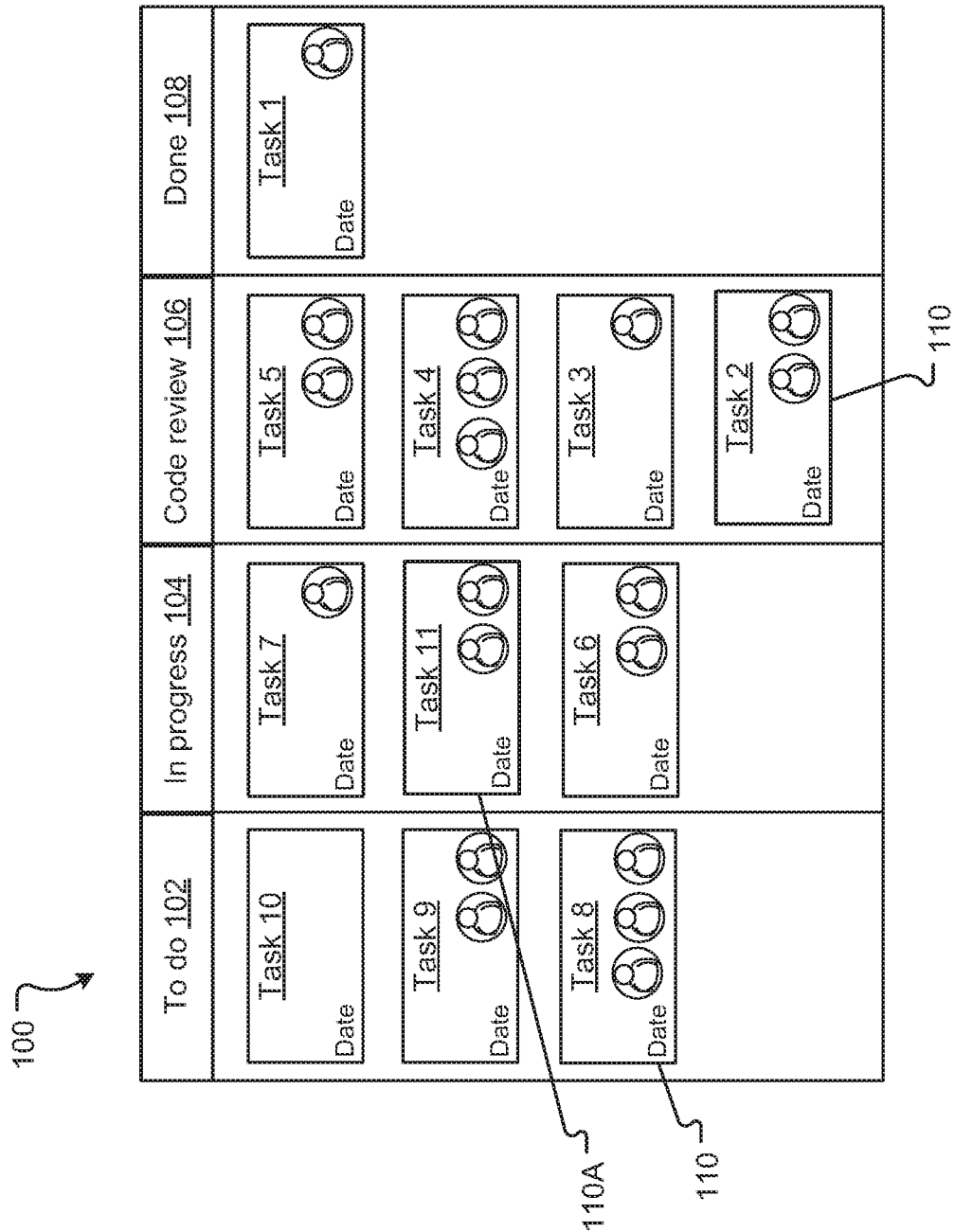

Typically, when a user drags a card from one location to another using an input control, the transition of the card from the first location to the second is animated and other objects in the destination can be animated to move out of the way of the dragged object so that it can be dropped at the desired destination. FIGS. 1B-1D depict this animation.

In particular, FIG. 1B, shows the board 100 at a first point in time, where the user has initiated a drag and drop operation on card 110A by selecting card 110A with a cursor 112 and dragging card 110A from its original position in column 102. The cursor 112 at this stage still hovers over a droppable area 111A overlaying column 102 and has not yet moved into a droppable area overlaying another list on the board. At this stage, the user interface shows card 110A is moved (e.g., by a distance that corresponds to the distance by which the cursor has moved from its original position when the drag operation started to its current position), and places a placeholder area 114 (also known as a "non-visible" object) that may be the same size as card 110A in the original or home position of card 110A.

In some cases, the placeholder area 114 is displayed in the original position from the moment the card dragging operation commences and until the cursor 112 is detected to be outside the droppable area of that column, i.e., column 102. This display of the placeholder area 114 allows a user to remember where the card 110A was originally positioned and also indicates the destination position of card 110A if the user were to end the drag operation at this point.

FIG. 1C, shows the board 100 at a second point in time, where the user has dragged card 110A such that cursor 112 is now hovering over a droppable area 111B overlaying column 104. Once cursor 112 passes from the droppable area 111A overlaying column 102 to the droppable area 111B overlaying column 104, the user interface shows a corresponding placeholder area 114 in column 104 at the position of the cursor 112. If other cards were present in this position, these are pushed down by a distance corresponding to the height of the placeholder area (e.g., see card representing 'Task 6' that is pushed down). In some cases, the placeholder area 114 may be removed from column 102 when it is displayed in column 104. In other cases, the placeholder area may be displayed in both the original or home location and the destination location such that the user may easily discern the destination and original location of the card in case the user wishes to proceed with the operation or not.

FIG. 1D shows board 100 at a third point in time, where the user has dropped (that is, deselected by cursor 112) card 110A after cursor 112 has moved to hovering over the droppable area 111B overlaying list 104 between the location of cards representing 'Task 7' and 'Task 6'. Card 110A is therefore transitioned to list 104 and dropping card 110A on this list completes the drag and drop operation. This completion of the drag and drop operation is also referred to as a card transition.

In the description of FIGS. 1A-1D above, it is assumed that the animation and switching of the placeholder area 114 from the source list to the destination list occurs based on the position of the cursor on the user interface. In other embodiments, this switching may be determined based on the center of gravity of the selected card—regardless of where the cursor grabs and initiates the drag operation from. The placeholder area 114 switches from the source list to a next list when the center position of the card crosses the boundary of the droppable area of a list. Further, resting cards will move out of the way of a dragged card when the center position of the dragged item crosses the edge of the resting card. In other words, once the center position of the dragged card crosses the edge of another resting card in a list, the resting card moves out of the way and a card placeholder is created for the dragged objection in that position.

It will be appreciated that a transition or dragging event can be initiated by selecting and dragging an object (for example, any of the cards of FIGS. 1A to 1D) from its initial location. However, as referred to herein, that operation is completed as a transition or 'card event' only when the object is dropped at a different location. It is possible for a dragging operation to be initiated but where the object is dropped back at its initial location, the operation is not referred to as a transition or card event in this disclosure. For example, if card 110A was dropped after the first point in time, it would be dropped at its initial location and the transition will not be completed as board 100 will go back to its form at the first point in time prior to card 110A being selected.

The animation sequence described above improves user experience when dragging and dropping objects within the virtual board and allows users to feel like they are moving physical objects around.

However, this animation is generally not available in real-time collaborative virtual boards—i.e., boards that are simultaneously being viewed and/or updated by multiple users. When a remote user moves a card 110 from one location to another in such collaborative boards, that user may be able to see the animation (because they provide the input control for the transition). However, other users that are concurrently viewing or editing the same virtual board are unable to view the transition animation. Instead, on their user interfaces, the card simply gets deleted from the original location and appears in the new location without any transitional animation. This typically happens because the animation requires an active user input and the other users do not actively select and move the card using their own input devices.

Aspects of the present disclosure address this. In particular, aspects of the present disclosure provide systems and methods for animating transitions of cards in collaborative virtual boards when remote users transition cards from one droppable location to another. This improves user experience and allows users to not only feel like the cards are physically moving around but also ensures users can clearly see card transitions made by remote users in near real time.

To do so, aspects of the present disclosure employ an animation module in client devices that is configured to receive indication that a remote user has transitioned a card from an origin to destination location, create a trajectory and transition points from the origin to the destination location on the user interface, and then animate movement of the card from the origin to destination along the created transition points.

These and other aspects of the present disclosure will be described in the following sections.

Example System

In the following, a networked environment and computer processing system configurable to implement various features and techniques described herein are described. Following this, example computer implemented methods for animating card transitions will be described.

Figure 2:
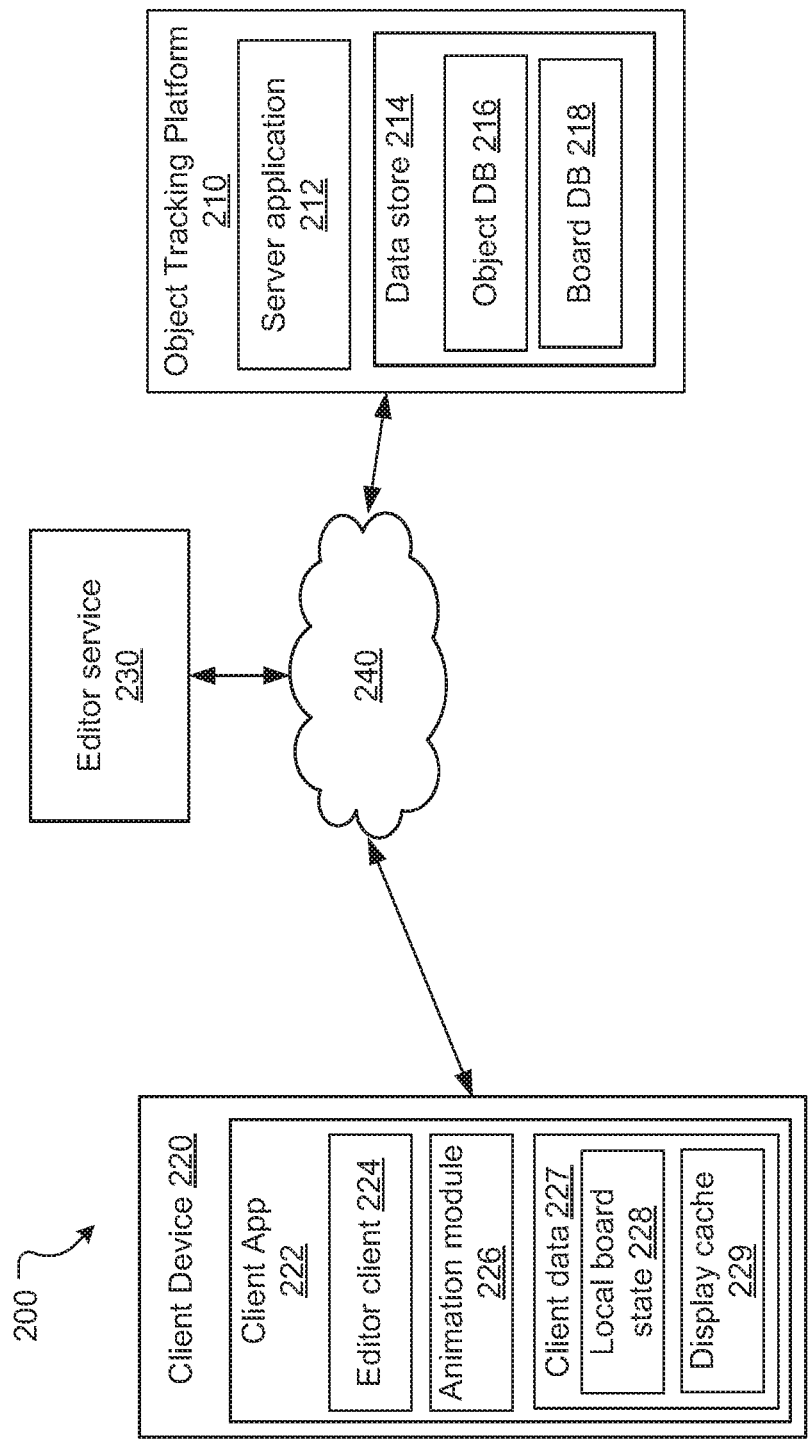
FIG. 2 is a block diagram of a networked environment in which aspects of the present disclosure can be implemented.

FIG. 2 illustrates an example networked environment 200 in which the various operations and techniques described herein can be performed. Specifically, FIG. 2 illustrates the various systems and modules involved in animating transitions of cards in a virtual board 100 according to embodiments of the present disclosure. Networked environment 200 includes an object tracking platform 210, a client device 220, and an editor service 230, which communicate via one or more communications networks 240.

Generally speaking, the object tracking platform 210 may be a computer processing system or set of computer processing systems configured to provide an object tracking application used (inter alia) to create, manage, and track objects. Object tracking platform 210 may, however, provide other services/perform other operations. In order to provide such services/operations, the object tracking platform 210 includes a server application 212 and a main data store 214.

The server application 212 is executed by one or more computer processing systems to provide server-side functionality to a corresponding client application (e.g., client application 222 as discussed below). In one example, the server application 212 is configured to cause display of a board (e.g., virtual board 100) on the two or more client devices 220. Further, the server application 212 is configured to receive data requests from the client devices 220 to load or update virtual boards and responds to these data requests. For example, when the server application 212 receives a request to load a virtual board, it may respond with data defining the structure (e.g., styling information), content (e.g., the actual data to be displayed on the web page), and behavior (e.g., interactive components) of the virtual board. Further, the server application 212 may be configured to receive data update instructions from the client devices 220 (e.g., to add a new card to a board, move a card from one column to another, delete a card on a board, add or delete a column of the board, etc.) and may be configured to perform actions based on these instructions, e.g., it may update the main data store 214 based on the received data update instructions.

The server application 212 comprises one or more application programs, libraries, APIs or other software elements that implement the above-described features and functions. For example, where the client application 222 is a web browser, the server application 212 is a web server such as Apache, IIS, nginx, GWS, or an alternative web server. Where the client application 222 is a specific/native application, server application 212 is an application server configured specifically to interact with that client application 222. In some embodiments, the server application 212 may be provided with both web server and application server applications.

The main data store 214 includes one or more databases management systems (DBMS) and one or more databases 216 and 218 (operating on one or multiple computer processing systems). Generally speaking, the DBMS receives structured query language (SQL) queries from a given system (e.g., server application 212), interacts with the one or more databases 216, 218 to read/write data as required by those queries, and responds to the relevant system with results of the query.

The data store 214 may store any data relevant to the services provided/operations performed by the server application 212. By way of a specific example, the data store 214 stores an object database 216 and a board database 218.

The object database 216 stores data related to objects (e.g., tasks or work items) that are maintained and managed by the object tracking platform 210. In this case, various data can be maintained in respect of a given object, for example: an object identifier; an object state; a team or individual to which the object has been assigned; an object description; an object severity; a service level agreement associated with the object; a tenant to which the object relates; an identifier of a creator of the object; a project to which the object relates; identifiers of one or more objects (parent objects) that the object is dependent on; identifiers of one or more objects (children objects) that depend on the object; identifiers of one or more other stakeholders; and/or other data.

Data for an object may be stored across multiple database records (e.g., across multiple database tables) that are related to one another by one or more database keys (for example object identifiers and/or other identifiers).

The board database 218 stores data related to virtual boards maintained by the platform 210. This includes, e.g., for each virtual board, a board identifier, a board name, a board description, a creator of a board, number of columns and/or swimlanes in the board, names of columns and/or swimlanes in the board, a list of objects that are part of the board and a list of assignees associated with those objects. As used herein, such board data is referred to as board state data. The board state data may be stored in one or more tables or storage devices as board state records, where each record corresponds to a given board.

Although the databases 216, 218 are depicted as being part of the main data store 214, these databases may also be maintained as in-memory caches. Further, one or more of these databases may be maintained as separate entities with their own DBMS.

The systems of the object tracking platform 210 typically execute on multiple computer processing systems. For example, in some implementations each component of the object tracking platform 210 may be executed on a separate computer processing system. In other embodiments, multiple (or even all) components of the object tracking platform 210 may run on a single computer processing system. In certain cases, a clustered server architecture may be used where applications are executed across multiple computing instances (or nodes) that are commissioned/decommissioned on one or more computer processing systems to meet system demand. For example, the server system 212 may be implemented as multiple nodes connected to the network 240 via a load balancer.

The client device 220 may be any computer processing system which is configured (or configurable) by hardware and/or software to offer client-side functionality. By way of example, suitable client devices may include: server computer systems, desktop computers, laptop computers, netbook computers, tablet computing devices, mobile/smart phones, and/or other computer processing systems.

In some embodiments, client device 220 hosts a client application 222 which, when executed by the client device 220, configures the client device 220 to provide client-side functionality of the object tracking system. This may include, for example, interacting with (i.e., sending data to and receiving data from) server application 212 to rendering user interfaces, such as virtual boards by way of which a user interacts with the object tracking platform 210. Such interactions typically involve logging on (or otherwise accessing) server application 212 by providing credentials for a valid account maintained by the object tracking platform 210. Once validated, a user can perform various functions using client application 222, for example requesting a virtual board to be loaded, viewing or editing the virtual board including adding or deleting cards 110 in the virtual board 100 or transitioning the state of a card by dragging it and dropping it from one column or state or another.

Client application 222 may be a general web browser application (such as Chrome, Safari, Internet Explorer, Opera, or an alternative web browser application) which accesses a server application such as server application 212 via an appropriate uniform resource locator (URL) and communicates with the server application via general world-wide-web protocols (e.g., HTTP, HTTPS, FTP). Alternatively, the client application 222 may be a native application programmed to communicate with server application 212 using defined application programming interface (API) calls. When the client application 222 is a web browser, its main function is to present web resources requested by the user. Further, a given client device 220 may have more than one client application 222, for example it may have two or more types of web browsers.

In addition to allowing a user to view and/or edit virtual boards, the client application 222 allows users to do so in a real-time collaborative fashion with other users. That is, the client application 222 may indicate if any other users are simultaneously viewing/editing a virtual board being viewed by a user of the client device 220 and update the virtual board in near real time to show changes made by other users, including showing, e.g., information about which user made the changes. In order to provide this real-time collaborative functionality, the client application 222 includes an editor client 224. The editor client 224 is configured to maintain communication with the editor service 230 when the client application 222 is active, receive content update information from the editor service 230 (described below) for the virtual board currently displayed by the client application 222 and based on this update information update the virtual board 100 displayed on the client device 220. The updates may be highlighted so that the user can easily see that some other user has made a change to a card 110 on the virtual board 100, transitioned a card from one column to another, and added or deleted a card.

Client application 222 also includes an animation module 226 that is configured to render card transition animations when remote users (present on other client devices) transition cards. Functionality of the animation module 226 will be described in detail later.

In addition to the editor client 224 and animation module 226, the client application 222 maintains local data on the client device 220, e.g., in a cache. The local data maintained includes local board state data 228 and local display cache 229. The local board state data essentially replicates the board state data for a virtual board displayed on the client device 220. It includes information about the columns displayed in the virtual board and the cards present in each column. It may also include content of the cards.

Different client devices have different display sizes and possibly have different zoom settings—this affects how much of the virtual board 100 is displayed on a display of the client device at any given point. Further, the size of the virtual board 100 itself may vary, such that the entire virtual board 100 is not visible on a display. To keep track of the virtual board 100 that is currently visible on the client device 220, the client application 222 maintains a display cache 229 that stores data about the cards and columns/list that are displayed on the client device at any given point. In particular, it may store card identifiers and position identifiers of visible cards. As the user scrolls or otherwise moves the virtual board 100, additional portions of the virtual board may become visible and may be added to this display cache 229 and other portions may disappear from the display and be removed from this display cache 229.

It will be appreciated that the user may have multiple virtual boards open at any given time (e.g., as different tabs in a web browser). In such cases, each tab of the web browser may be considered an individual client application 222 and the client device 220 may have multiple client applications running at the same. Each client application in this case 222 may maintain its own local board state 228 and display cache 229. While the corresponding virtual board is displayed, a client application 222 maintains the board state data and display cache. Once the virtual board is closed, the client application 222 may flush its corresponding board state data 228 and display cache 229.

The client application data 227 may also include an animation queue (not shown), which is configured to maintain an ordered list of all the card transitions made by remote users that are not yet animated on the client device 220. The animation module 226 retrieves card transitions from the animation queue and executes the corresponding animations.

The editor service 230 enables collaborative editing—i.e., allows multiple users to edit the same virtual board 100 at the same time and provides information about changes made by remote users in near real time. To this end, the editor service 230 is configured to maintain a log of all client applications 222 that are currently viewing/editing the same virtual board. It may maintain multiple such logs for different virtual boards that are being viewed/edited at any given time. Further, it is also configured to receive change messages from editor clients 224 reporting changes made to virtual boards and broadcast these change messages to editor clients 224 of other users that are also currently viewing/editing that virtual board. The editor service 230 may also be configured to resolve conflicts—e.g., if two users make changes to the same object/card concurrently, the editor service 230 may be configured to resolve this conflict—e.g., by accepting the change from one of the users and not accepting the change from the other user.

Much like the object tracking platform 210, the editor service 230 may also be implemented as a clustered architecture where the editor service 230 is executed across multiple computing instances (or nodes) that are commissioned/decommissioned on one or more computer processing systems to meet system demand. Further, the editor service 230 may be logically subdivided into front end nodes and worker nodes. The front-end nodes may be configured to receive and broadcast changes and the worker nodes may be configured to handle conflict resolution and/or determine whether an incoming change request is valid or not.

The object tracking platform 210, client device 220, and editor service 230 communicate data between each other either directly or indirectly through one or more communications networks 240. Communications network 240 may include a local area network (LAN), a public network, or a combination of networks.

It will be appreciated that although FIG. 1 shows a single client device, in reality, multiple client devices can be in communication with the object tracking platform 210 and the editor service 230 at any given time.

The systems and modules described with respect to FIG. 1 are implemented using one or more computer processing systems.

Figure 3:
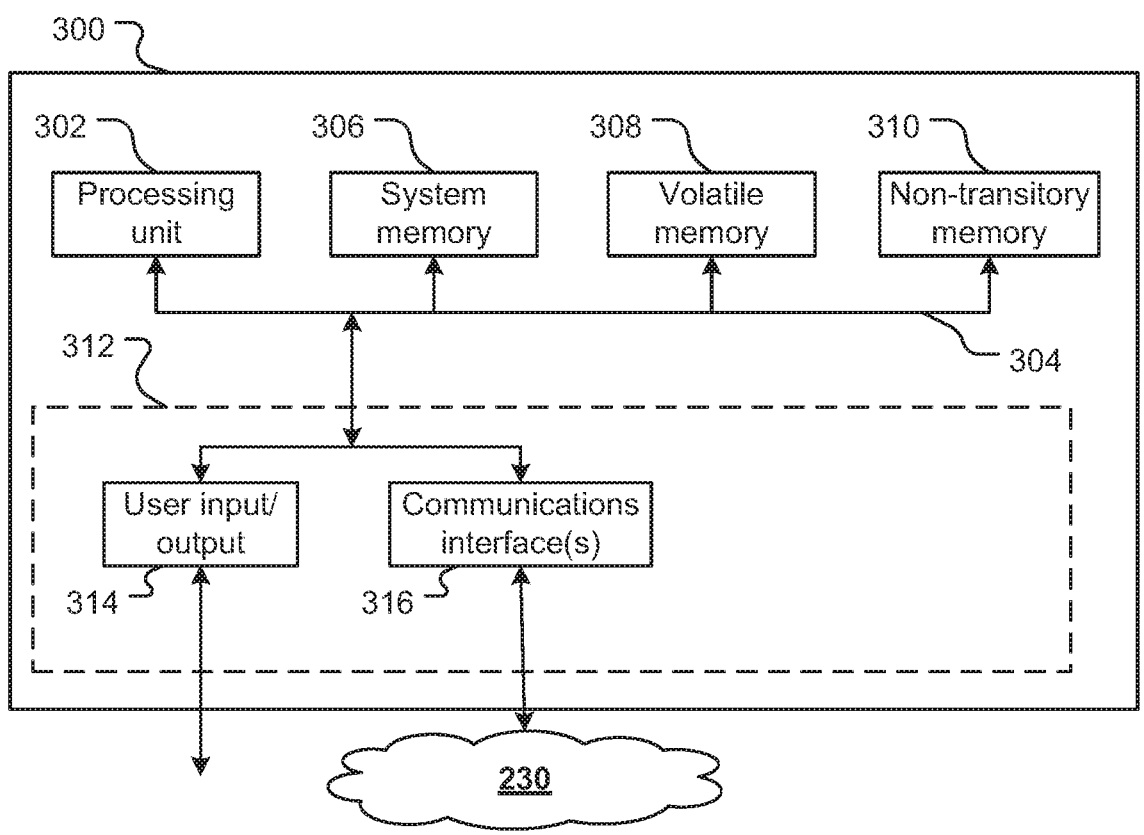
FIG. 3 is a block diagram of a computing system with which various embodiments of the present disclosure may be implemented/configurable to perform various features of the present disclosure.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with one or more computer readable storage devices which store instructions and/or data for controlling operation of the processing system 300. In this example system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 240 of environment 200. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—e.g., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™, Unix™ or Linux™.

System 300 also stores or has access to applications which, when executed by the processing unit 302, configure system 300 to perform various computer-implemented processing operations described herein. For example, and referring to networked environment 200 of FIG. 2 above, client device 220 includes a client application 222 which configures the client device 220 to perform client system operations, and object tracking platform 210 includes server application 212 which configures the server environment computer processing system(s) to perform the described server environment operations.

In some cases, part or all of a given computer-implemented method will be performed by a single computer processing system 300, while in other cases processing may be performed by multiple computer processing systems in data communication with each other.

Example Methods

Figure 4:
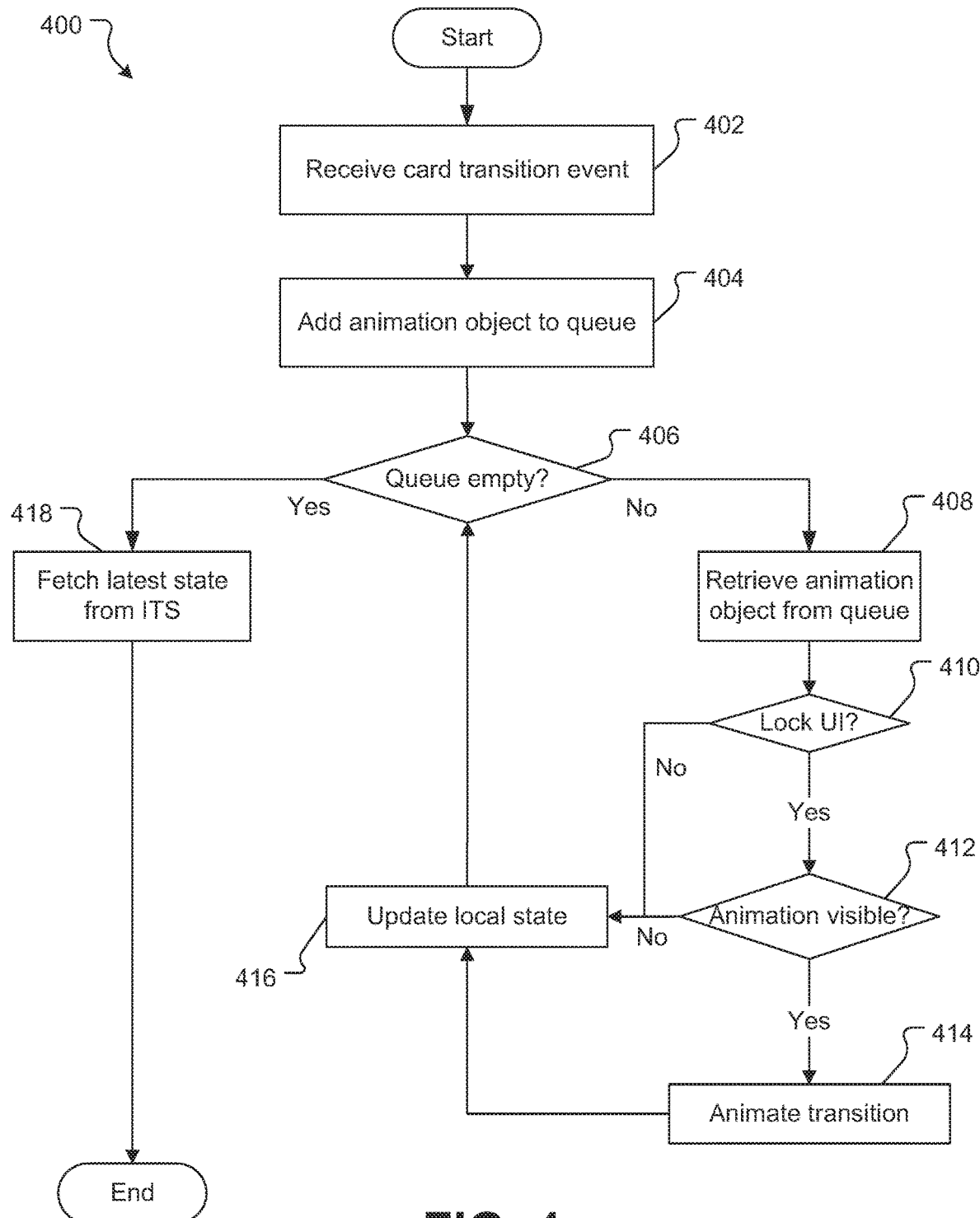
FIG. 4 is a flowchart illustrating an example method for animating a card transition according to aspects of the present disclosure.

FIG. 4 is a flowchart depicting an example process 400 for animating a card transition in a virtual board displayed on a client device in response to a remote user performing a card transition event.

A remote user on another client device 220 may be viewing a virtual board (e.g., virtual board 100) on their client device 220. The remote user may transition a card from one location to another location in the virtual board 100—e.g., the user may transition a card from one location in a column to another location in the same column or the user may transition a card from one location in one column to another location in another column. In either case, once the transition is completed, that is once the card has been dropped to a droppable area of the virtual board 100 that is not the original location, the client application 222 and in particular the editor client 224 of the remote client device generates a card transition event and communicates this to the editor service 230. The card transition event may include e.g., a unique identifier of the virtual board, a unique identifier of the transitioned card and a destination location of the card in the virtual board (e.g., column identifier and position of card within the column). The card transition event may also include an original location of the card in the virtual board (e.g., column identifier and position of card within the column), however, this field may not be necessary. In addition, the card transition event includes a user identifier of the remote user.

The editor service 230 receives the card transition event and broadcasts this event to all the client devices that are currently viewing/editing the same virtual board. To this end, the editor service 230 may inspect the card transition event to retrieve the virtual board identifier and then inspect its log of active clients to identify the active clients that are currently viewing/editing that virtual board. The editor service 230 may also validate the card transition event before broadcasting it to the active client devices. For example, the editor service 230 may determine whether the card transition event is for a card for which it has simultaneously received another card transition event from another remote user. If that is the case, the card transition event may be discarded. Alternatively, if it determines that it has not simultaneously received another card transition event for the same card, it may broadcast the event.

It will be appreciated that as and when the editor service 230 receives card transition events, it broadcasts these events (after validation) to the editor clients of all active client devices that are viewing/editing the corresponding virtual board at that time.

Method 400 commences at step 402, where a client application 222 and in particular the editor client 224 of a client device 220 that is currently viewing/editing the virtual board 100 receives a card transition event from the editor service 230.

At step 404, the editor client 224 converts the received card transition event into an animation object and queues the animation object in the animation queue. The animation queue may be a message queue that stores animation objects until they are retrieved by the animation module 226. In one example, the animation object may include, e.g., the card identifier, an identifier of the card's original location and an identifier of the card's destination location. It may also include an identifier of the user that made the transition. Table A below shows an example animation object—

TABLE A example animation object

```
type AnimationObject = {
    sourceNodeId: number,
    destinationNodeId: number,
    userId: string,
};
```

It will be appreciated that the editor client 224 may sometimes receive card transition events in quick succession—e.g., it may receive card transition events to transition a card from location A to location B, another event to transition the same card from location B to C and perhaps another event to transition the card from location C to D. In some examples, the editor client 224 may create and queue animation objects based on these card transition events in the order in which these events are received and the animation module 226 may animate each of these transitions in order. In other cases, the editor client 224 may create a single animation object based on such transition events received for the same card. For example, instead, of creating separate animation objects for each of these transitions, it may create a single animation object to transition the card from location A to D. In some cases, the editor client 224 may clump transitions together if they are related to the same object/card and if the transition events are received within a threshold amount of time. For example, if the editor client 224 receives two transition events related to the same card within 5 seconds of each other, it may clump them together in a single animation object. However, if the same transition events are received 10 seconds apart, it may treat them as separate transitions and create two animation objects for the transition events.

At step 406, the animation module 226 is invoked and it checks the animation queue to see if there are any pending animation objects in the queue. If the animation module 226 determines that there are one or more animation objects in the queue—i.e., the queue is not empty, the method proceeds to step 408, where the animation module 226 retrieves one of the queued animation objects from the animation queue based on a consumption order configured for the queue. In some examples, the animation queue may function as a first-in-first-out queue. In such cases, the animation module 226 retrieves the oldest animation object in the queue first. In other examples, the animation queue may have some other consumption order such as first-in-last-out and the animation module 226 retrieves the latest animation object from the queue. In any event, to avoid confusion, the animation module 226 may animate one transition at a time and therefore picks one animation object from the queue.

At step 410, the animation module 226 inspects the retrieved animation object to determine the card identifier of the card that is to be transitioned and attempts to lock the displayed UI. Locking the UI involving taking exclusive control of the UI. Once the UI is locked, objects displayed in the board cannot be dragged by any other entity (including the user). If the user is currently transitioning a card in the UI, e.g., in a drag and drop operation, the animation module 226 will be unable to lock the UI. Similarly, if the UI is already locked by another thread of the animation module 226, it will not be lockable. If the user attempts to make any transitions while the UI is locked, these transitions may either be ignored or they may be queued in the animation queue along with other animation objects to be implemented once the UI lock is removed.

If at step 410, the animation module 226 is able to lock to the UI (e.g., because it not currently being controlled by any other entity), the method proceeds to step 412, where the animation module 226 determines whether the card transition will be visible in the portion of the user interface currently displayed on a display of the client device 220.

To this end, the animation module 226 performs a look up of the card identifier received in the animation object in the display cache 229. If the animation module 226 finds a match for the card identifier in the display cache 229, it determines that the card is visible. Alternatively, if the animation module 226 does not find a match for the card identifier in the display cache, it determines that the card is not visible to the user. Further, the animation module 226 may determine whether the destination location of the card (after the transition) will be visible on the display of the client device 220 or whether the destination location will be off-screen. In one example, it may make this determination by identifying the identifier of the card that is currently displayed at the destination location and determine whether this card is present in the display cache 229 (by performing a lookup of the card identifier in the display cache 229). If it determines that this card is present, the animation module 226 determines that the destination location of the card is visible on the display of the client device 220. Otherwise, it determines that the destination location is not visible on the display of the client device 220.

If at step 412, a determination is made that the transition will be visible, e.g., because the source and destination locations are visible, the method proceeds to step 414 where the animation module 226 animates the card transition based on the animation object. As described previously, the animation object includes a source or original location of the card in the virtual board and a destination location of the card in the virtual board. This information may be in the form of column number and position within the column. At step 412, the animation module 226 calculates the x and y coordinates for the source location and the destination location (e.g., based on the position of the source and destination locations in the display cache 229) and generates instructions which cause the client application 222 to animate the transition of the card from the original location to the destination location.

This animation may be performed in a number of different ways. In one example, the animation module 226 first determines a trajectory for the card from the origin location to the destination location. That is, the animation module 226 determines the path to be followed by the card from the source location to the destination location. In some examples, the trajectory may be straight-lined from the source to the destination. In other examples, other trajectories, such as curved trajectories, may be employed.

Figure 5:
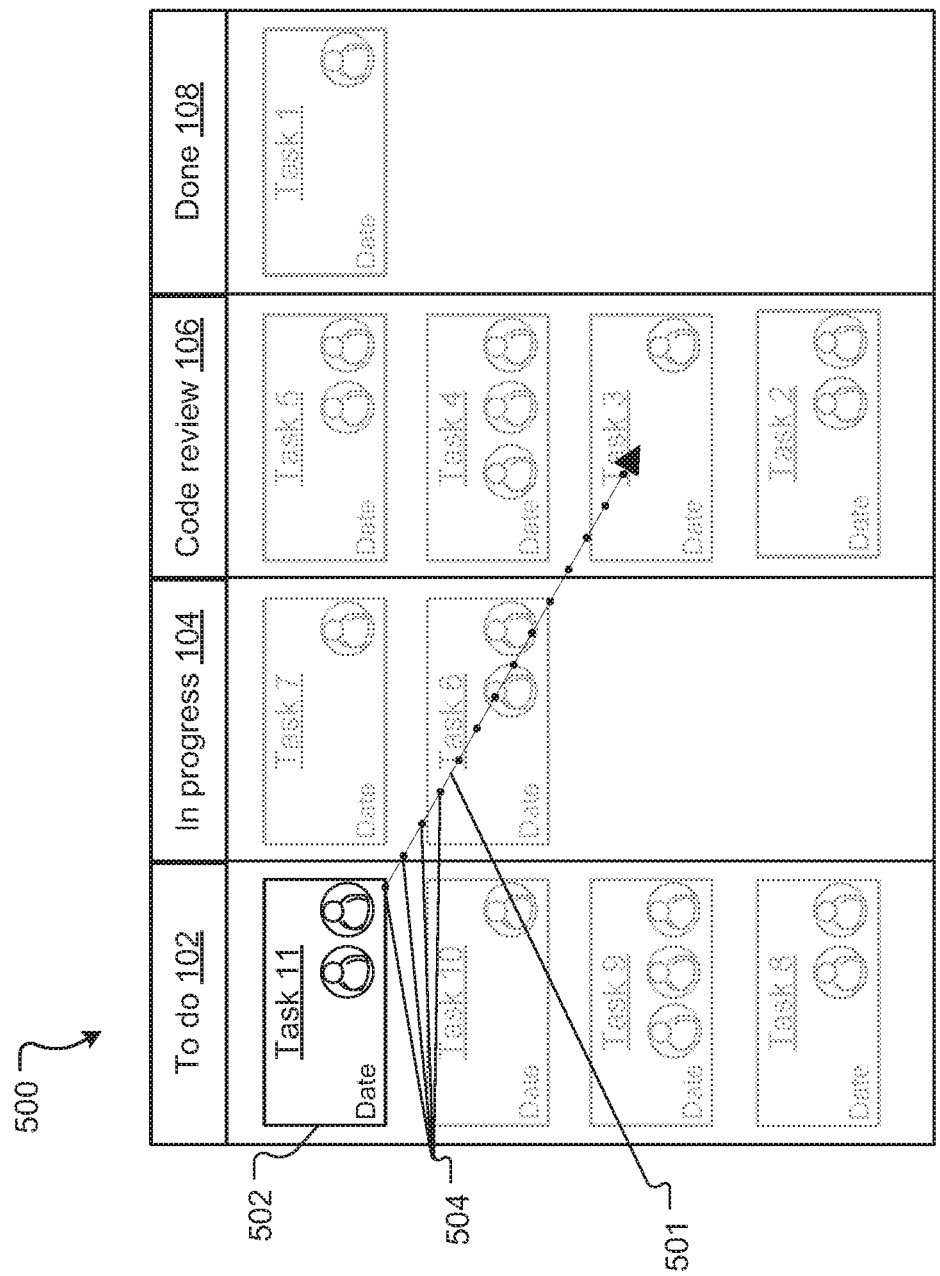
FIG. 5 is a diagram of an example virtual board with an animation trajectory determined according to aspects of the present disclosure.

In this example, in addition to determining the trajectory, the animation module 226 determines the coordinates of transition points between the source location and the destination location via which the card is supposed to transition from the origin to the destination location. For example, consider the virtual board 100 shown in FIG. 5. In this example, if the origin location of card 502 is as shown (i.e., first card in column 102) and the destination location of card 502 is the third card in column 106), the animation module 226 determines a straight-lined trajectory 501 from the source to the destination and determines the number of transition points between the origin and destination locations the card 502 should transition through and also their coordinates. In the example shown in FIG. 5, it is determined that the card is to transition through 14 equidistant transition points (as shown by the dots 504 along the trajectory 501). It will be appreciated that the number of transition points between the origin and destination will depend on the distance between the origin and destination. Further, this number can be varied based on desired look and feel and computational intensity—the greater the number of points, the more real the animation will feel but greater the computational intensity, the lesser the transition points, the more artificial the animation will feel but lesser the computational intensity. Further still, the distribution of these transition points along the trajectory may be equidistant (as shown in FIG. 5) or may follow some other mathematical formula to emulate real life movements. For example, the points may be more spread-apart in the beginning portion of the trajectory but may be positioned closer to each other in the end-portion of the trajectory to emulate fast animations in the beginning and then a deceleration towards the end (just before the card 502 is dropped). In another example, the points may be positioned closer to each other in the beginning and end portions but may be spaced further apart in a central portion. This may produce a slow animation when the card 502 is first selected and a slow animation when it is eventually dropped but a fast animation in between.

In one example, an easing function, that specifies the rate of change of a parameter over time, may be employed to determine the coordinates of the transition points. In one example, a sine ease in and ease out function may be employed. The animation module 226 provides the following values to the function—a time period for the animation, a start coordinate, an end coordinate, and a number of transition points between the start and end coordinates. The function returns the coordinates of the points between the start and end coordinates. An example of this easing function and its output is provided in the table below—

```
const easeInOutSine = (time, start, end, count) => {
  const diff = end - start;
  return (-diff / 2) * (Math.cos((Math.PI * time) / count) - 1) + start;
};
```

It will be appreciated that the number of transition points may be variable and may be determined based on the distance a card needs to travel—for larger distance, more transition points may be required and for shorter distances fewer transition points may be required. In other cases, the number of transition points may be fixed predetermined value.

Once the coordinates of the transition points are determined, the animation module 226 renders the animation by moving the card to each of the transition points in the trajectory. In one example, this may be done by providing the following instructions that basically instruct a rendering module of the client device 220 to drag the card to each point along the trajectory until no more points are left and then drop the card—

```
export const animateCard = (drag: FluidDragActions, points:
Position[ ]) => {
  requestAnimationFrame(( ) => {
    const nextPosition = points.shift( );
    drag.move(nextPosition);
    if (points.length) {
      animateCard(drag, points);
    } else {
      drag.drop( );
    }
  })
};
```

It will be appreciated that this is one method for animating the transition. Other mechanisms for animating the transition may be employed without departing from the scope of the present disclosure. For instance, in another example, Cascading Style Sheets (CSS) animations may be used instead. To apply CSS animations, one or more keyframes for the animation are defined (which define what styles a given object will have at certain times during the animation) and the animation is then bound to the object that is to be transitioned. For example, the keyframe for a transition may include the start position of the object and the destination position of the object (e.g., in x, y coordinates, or pixel coordinates). It may also include a duration for the animation. When the animation module 226 determines that a transition is to be animated (e.g., after step 412), it retrieves the source and destination locations of the card from the animation object and calculates the coordinates for these locations. It then generates the keyframe (including the source and destination coordinates and duration of the animation) and binds this keyframe to the card/object. The rendering module of the client 222 may then perform the animation from the source to the destination for the specified duration of the animation. In this case, the animation module 222 does not need to calculate intermediate transition points as these are automatically computed by CSS.

Returning to FIG. 4, once the animation is completed, the method proceeds to step 416, where the local state of the virtual board is updated. As described previously, in addition to a display cache 229, the client also maintains board state data 228 that stores information about the virtual board including e.g., the columns in the board, the cards in the board and their positions with respect to columns. Once the animation is completed, the animation module 226 is configured to update this board state data 228 and in particular the position of the transitioned card. For example, in the case of the transition shown in FIG. 5, the animation module 226 may update the board state data 228 such that the position of card 502 is updated from position 1, column 1 to position 3, column 3.

The method then proceeds to step 406 where the animation module 226 checks if there are any other animation objects present in the animation queue. If additional animation objects are present in the queue, the method proceeds to step 408 and steps 408-416 are repeated until the animation queue is empty.

Alternatively, if at step 406 it is determined that the animation queue is empty, the method proceeds to step 418 where the client 222 fetches the latest state of the virtual board 100 from the object tracking platform 210. To this end, the client application 222 may generate a request for board state data that includes the identifier of the board and communicate this to the object tracking platform 210. Upon receiving this request, the object tracking platform 210 queries the board database 218 with the received board identifier to retrieve the board state data for the virtual board. It may then communicate this board state data to the requesting client 222. The client 222 upon receiving the board state data of the virtual board from the object tracking platform 210 may compare this with its own local board state data 228.

The version of the board state data maintained by the object tracking platform 210 is the version of the virtual board that incorporates all the latest changes made to the virtual board. By comparing the local state of the virtual board with that maintained by the object tracking platform 210, the client 222 can validate the local state of the board. If any changes were made to the local state of the board, e.g., based on the queued animation objects, the client 222 can determine whether those changes were correct—by comparing the state of the local board scope with the latest state of the board maintained by the server. Second, if any animations were cancelled in the middle of step 414, these animations may be removed from the animation queue before the local state can be updated. This may cause the local state of the virtual board to be out of sync. By comparing the local state of the virtual board with the state maintained by the server the client 222 can update the local state of the virtual board to be in line with the actual state of the virtual board.

At step 418, if the client 222 compares the retrieved board state with the local board state data 228 and determines that there are no differences between the two, it may determine that the local state of the virtual board is accurate and method 400 may end. Alternatively, if the client 222 compares the retrieved board state data with the local board state data 228 and determines that there are differences between the two, it updates the local board state data 228 to match the board state data maintained by the server and updates the displayed virtual board as well. In this case, if cards are in incorrect positions, it may correct the positions of the cards without animating the movements. Method 400 then ends.

Returning to step 410, if at step 410 the animation module 226 is unable to lock the card, the method proceeds directly to step 416, where the animation module 226 updates the local state of the virtual board based on the animation object without producing a corresponding animation. Similarly, if at step 412, the animation module 226 determines that the source or destination location of the card is not visible on the display of the client device 220, the method directly proceeds to step 416 where the animation module 226 updates the local state of the virtual board based on the animation object without producing a corresponding animation.

In the method 400, at step 412, a determination is made whether the entire transition from the source to the destination will be visible on the display of the client device. If the entire transition is visible, the animation is performed, but if the entire transition is not visible, the animation is not performed. This may be done to reduce the load on the client device's processor and reduce processing times. However, in other embodiments, where this is not a concern, animations may be performed even in cases where a portion of the transition is visible on the display screen. For example, if the source is out of view but the destination is in view, the client 222 may determine at step 412 to perform the animation. Similarly, if the source is in view, but the destination is out of view, the client 222 may decide to perform the animation.

In addition to animating the card transitions, the presently disclosed systems and methods may do so in a manner that allows remote users to identify which user originally made the card transition. In one example, the editor client 224 may assign different colors to different remote users that are also currently viewing/editing the virtual board. Then during animation, the animation module 226 may highlight the border of the animated card using the color assigned to the user that made the transition. Additionally, or alternatively, the animation module 226 may highlight the user that made the transition by including the name or avatar of that person to the card during the transition—e.g., in a top heading strip or at a corner of the card. In any case, such highlighting helps the user quickly discern which remote transitioned the card.

Although aspects of the present disclosure are described with reference to an object tracking application, it will be appreciated that this need not be the case. Aspects of the present application can be implemented in user interfaces associated with other types of software applications. For example, aspects of the present disclosure can be used in user interfaces associated with software applications that display interactive data in the form of tables, grids, or lists with interactive or movable objects (such as cells, rows, columns, values) within the tables, grids, or lists.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. A computer-implemented method, comprising:
causing display, in a first client device corresponding to a first remote user, of a first instance of a virtual board comprising a plurality of columns and a corresponding plurality of cards, each card of the corresponding plurality of cards draggable to other columns;
detecting an initiation of a transition event at the first client device, the transition event including a movement, on the first instance of the virtual board displayed on the first client device, of an object associated with a particular card from an origin location in response to a drag operation performed by the first remote user at the first client device;
detecting a destination location of the object within the first instance of the virtual board displayed on the first client device, the object moving along a first trajectory from the origin location to the destination location and defined by a movement of a cursor during the drag operation;
in response to detecting the destination location of the object, causing generation of an animation object associated with the transition event for display on other instances of the virtual board displayed on other client devices, the animation object including an identifier of the object, the origin location and the destination location of the object in a user interface;
determining whether animation is required for the animation object on the other instances of the virtual board;
upon determining that animation is required, generating, for at least one instance of the virtual board displayed on a corresponding client device of the other client devices, at an animation module, a second trajectory that is a different trajectory from the first trajectory, the second trajectory defining a path between the origin location and the destination location; and
animating, within the at least one instance of the virtual board displayed on the corresponding client device of the other client devices, an animation of the object in accordance with the second trajectory.

2. The computer-implemented method of claim 1, wherein generating the second trajectory includes:
determining the first trajectory for the object from the origin location to the destination location;
determining coordinates of a plurality of transition points along the first trajectory; and
rendering the animation along the second trajectory by moving the object from the origin location to the destination location to each of the plurality of transition points.

3. The computer-implemented method of claim 1, wherein determining whether animation is required includes determining whether at least a portion of the animation object is visible in a portion of a respective user interface displayed on a display of the other client devices.

4. The computer-implemented method of claim 1, wherein determining whether animation is required includes determining whether an entirety of the animation object is visible on a respective user interface displayed on the other client devices.

5. The computer-implemented method of claim 1, further comprising locking the user interface before animating the object in accordance with the second trajectory.

6. The computer-implemented method of claim 1, further comprising:
causing to be updated, in a local state cache of the user interface, a position of the object;
retrieving a latest state of the user interface from a remote server;
comparing the latest state of the user interface retrieved from the remote server with the position of the object in the local state cache of the user interface; and
upon determining that the local state cache of the user interface does not match the latest state of the user interface, updating the position of the object in the local state cache of the user interface to match the latest state of the user interface.

7. The computer-implemented method of claim 1, further comprising:
receiving, at the first client device, the transition event from a remote editor service, wherein the transition event includes a unique identifier of the user interface, the identifier of the object and the destination location of the object;
converting the transition event into the animation object; and
queuing the animation object in an animation queue.

8. A computer processing system, comprising:
a processing unit;
a communication interface; and
a non-transitory computer-readable storage medium storing instructions, which when executed by the processing unit, causes the processing unit to:
cause display, in a first client device corresponding to a first remote user, of a first instance of a virtual board comprising a plurality of cards, each card of the plurality of cards draggable to other columns;
detect an initiation of a transition event at the first client device, the transition event including a movement, on the first instance the virtual board displayed on the first client device, of an object associated with a particular card from an origin location in response to a drag operation performed by the first remote user at the first client device;
detect a destination location of the object within the first instance of the virtual board displayed on the first client device, the object moving along a first trajectory defined by a movement of a cursor during the drag operation;
subsequent to detecting the destination location, cause generation of an animation object including an identifier of the object, the origin location and the destination location of the object in a user interface;
determine whether animation is required for the animation object on a second instance of the virtual board displayed on a second client device; and
upon determining that animation is required, cause animation of the animation object associated with the particular card along a second trajectory that is different from the first trajectory, the second trajectory defining a path between the origin location and the destination location, within the second instance of the virtual board displayed on the second client device, the second trajectory generated by an animation module using the origin location and the destination location of the animation object.

9. The computer processing system of claim 8, wherein to animate the transition, the non-transitory computer-readable storage medium includes instructions, which when executed by the processing unit, cause the processing unit to:
determine the first trajectory for the object from the origin location to the destination location;
determine coordinates of a plurality of transition points along the first trajectory; and wherein:
the generation of the second trajectory by the animation module includes determining the path between the origin location and the destination location based on the plurality of transition points.

10. The computer processing system of claim 8, wherein to determine whether the animation is required, the non-transitory computer-readable storage medium includes instructions, which when executed by the processing unit, cause the processing unit to determine whether at least a portion of the animation object is visible in a portion of the user interface displayed on a display of the second client device.

11. The computer processing system of claim 8, wherein to determine whether the animation is required, the non-transitory computer-readable storage medium includes instructions, which when executed by the processing unit, cause the processing unit to determine whether an entirety of the animation object is visible in a portion of the user interface displayed on a display of the second client device.

12. The computer processing system of claim 8, wherein the non-transitory computer-readable storage medium storing instructions, which when executed by the processing unit, cause the processing unit to lock the user interface before animating the animation object within the second instance of the virtual board.

13. The computer processing system of claim 8, wherein the non-transitory computer-readable storage medium storing instructions, which when executed by the processing unit, cause the processing unit to:
  update a position of the object in a local state cache of the user interface;
  retrieve a latest state of the user interface from a remote server;
  compare the latest state of the user interface retrieved from the remote server with the position of the object in the local state cache of the user interface; and
  upon determining that the position of the object in the local state cache of the user interface does not match the latest state of the user interface, update the position of the object in the local state cache of the user interface to match the latest state of the user interface.

14. The computer processing system of claim 8, wherein the non-transitory computer-readable storage medium storing instructions, which when executed by the processing unit, cause the processing unit to:
  receive, at the first client device, the transition event from a remote editor service, wherein the transition event includes a unique identifier of the user interface, the identifier of the object and the destination location of the object; and
  queue the animation object in an animation queue.

15. A non-transitory storage medium storing instructions executable by processing unit to cause the processing unit to:
  cause display, in a first client device corresponding to a first remote user, of a first instance of a virtual board comprising a plurality of columns and a corresponding plurality of cards, each card of the corresponding plurality of cards draggable to other columns;
  detect an initiation of a transition event at the first client device, the transition event including a movement, on the first instance the virtual board displayed on the first client device, of an object associated with a particular card from an origin location in response to a drag operation performed by the first remote user;
  detect a destination location of the object within the first instance of the virtual board displayed on the first client device, the object moving along a first trajectory defined by a movement of a cursor during the drag operation;
  subsequent to detecting the destination location, cause generation of an animation object associated with the transition event, the animation object including an identifier of the object, the origin location and the destination location of the object in a user interface;
  determine whether animation is required for the animation object; and
  upon determining that animation is required, cause animation of the object associated with the particular card along a second trajectory different from the first trajectory, within a second instance of the virtual board displayed on a second client device, the animation, the second trajectory generated by an animation module using the origin location and the destination location of the animation object.

16. The non-transitory storage medium of claim 15, wherein to animate the transition the non-transitory storage medium includes instructions to:
  determine the first trajectory for the object from the origin location to the destination location;
  determine coordinates of a plurality of transition points along the first trajectory; and wherein:
    the second trajectory defines a path through the plurality of transition points.

17. The non-transitory storage medium of claim 15, wherein to determine whether the animation is required the non-transitory storage medium includes instructions to determine whether at least a portion of the particular card is visible in a portion of the user interface displayed on a display of the second client device.

18. The non-transitory storage medium of claim 15, wherein to determine whether the animation is required the non-transitory storage medium includes instructions to determine whether an entirety of the particular card is visible in a portion of the user interface displayed on a display of the second client device.

19. The non-transitory storage medium of claim 15, wherein the non-transitory storage medium stores instructions, which when executed by the processing unit, cause the processing unit to:
  update a position of the object in a local state cache of the user interface;
  retrieve a latest state of the user interface from a remote server;
  compare the latest state of the user interface retrieved from the remote server with the position of the object in the local state cache of the user interface; and
  upon determining that the position of the object in the local state cache of the user interface does not match the latest state of the user interface, update the position of the object in the local state cache of the user interface to match the latest state of the user interface.

20. The non-transitory storage medium of claim 15, wherein the non-transitory storage medium stores instructions, which when executed by the processing unit, cause the processing unit to:
  receive, at the first client device, the transition event from a remote editor service, wherein the transition event includes a unique identifier of the user interface, the identifier of the object and the destination location of the object;
  and
  queue the animation object in an animation queue.

* * * * *